United States Patent [19]

Ono

[11] Patent Number: 4,903,805
[45] Date of Patent: Feb. 27, 1990

[54] TEMPERATURE-CONTROLLED FAN FLUID COUPLING

[75] Inventor: Yuichi Ono, Numazu, Japan

[73] Assignee: USUI Kokusai Sangyo Kaisha Ltd., Shizuoka, Japan

[21] Appl. No.: 267,493

[22] Filed: Nov. 4, 1988

[30] Foreign Application Priority Data

Nov. 18, 1987 [JP] Japan .................. 62-291522

[51] Int. Cl.⁴ ............................................. F16D 35/00
[52] U.S. Cl. ................................. 192/58 B; 192/82 T
[58] Field of Search .......................... 192/58 B, 82 T

[56] References Cited

U.S. PATENT DOCUMENTS

| | | |
|---|---|---|
| 2,879,755 | 3/1959 | Weir . |
| 2,988,188 | 6/1961 | Tauschek . |
| 3,059,745 | 10/1962 | Tauschek . |
| 3,217,849 | 11/1965 | Weir . |
| 3,259,221 | 7/1966 | Godfrey . |
| 3,272,188 | 9/1966 | Sabat . |
| 3,430,743 | 3/1969 | Fujita et al. . |
| 3,463,282 | 8/1969 | Fujita et al. . |
| 3,727,735 | 4/1973 | La Flame . |
| 3,840,101 | 10/1974 | Peter et al. . |
| 3,856,122 | 12/1974 | Leichliter . |
| 3,964,582 | 6/1976 | Mitchell . |
| 4,238,016 | 12/1980 | Yoshida et al. . |
| 4,281,750 | 8/1981 | Clancey ................ 192/82 T X |
| 4,403,684 | 9/1983 | Haeck . |
| 4,505,367 | 3/1985 | Martin . |
| 4,629,046 | 12/1986 | Martin ................... 192/58 B |
| 4,665,694 | 5/1987 | Brunken . |
| 4,667,791 | 5/1987 | Martin et al. ............. 192/58 B |
| 4,685,549 | 8/1987 | Brunken et al. . |
| 4,699,258 | 10/1987 | Johnston et al. . |

FOREIGN PATENT DOCUMENTS

| | | |
|---|---|---|
| 55-76226 | 6/1980 | Japan . |
| 57-167533 | 10/1982 | Japan . |
| 57-179431 | 11/1982 | Japan . |
| 62-124330 | 6/1987 | Japan . |

Primary Examiner—Randolph A. Reese
Assistant Examiner—J. Russell McBee
Attorney, Agent, or Firm—Anthony J. Casella; Gerald E. Hespos

[57] ABSTRACT

A fan fluid coupling for controlling the rotational speed of a fan that cools an automobile engine. The coupling comprises an enclosed housing, a partition plate that divides the inside of the housing into an oil reservoir chamber and a torque transmission chamber, a driving disk, a dam, a passage extending from the torque transmission chamber to the oil reservoir chamber, a bimetallic strip, a valve member, an idle oil reservoir chamber, and a circular hole formed in the driving disk for placing the idle oil reservoir chamber in communication with the torque transmission chamber only when the associated engine is at rest. At least one small hole is formed in the wall defining the idle oil reservoir chamber, and this hole is in communication with the torque transmission chamber.

6 Claims, 9 Drawing Sheets

Fig. 7
Fig. 8
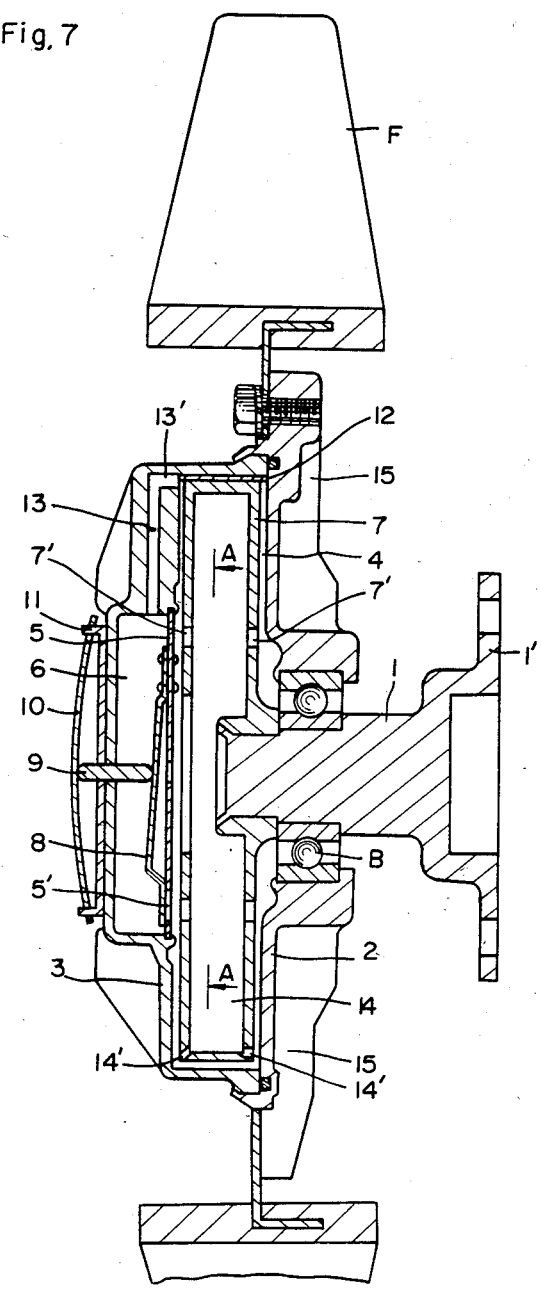
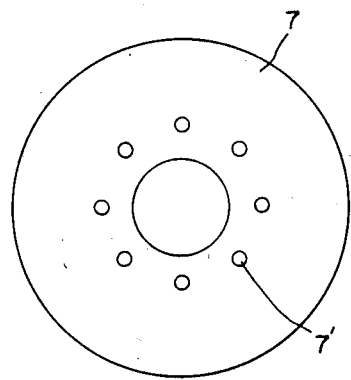

TEMPERATURE-CONTROLLED FAN FLUID COUPLING

BACKGROUND OF THE INVENTION

1. Field of the Invention

The present invention relates to a temperature-controlled fan fluid coupling which controls the rotation of a fan for cooling an automobile engine to supply an adequate amount of cooling air to the engine always according to the operating conditions and, more particularly, to an improvement over the fan fluid coupling already proposed by the present applicant in Japanese Patent Publication No. 7846/1984.

2. Description of the Prior Art

A conventional fan fluid coupling of this kind is shown in FIG. 9, where an enclosed housing is formed by a cover 23' and a case 23". The inside of this housing is divided into an oil reservoir chamber 25 and a torque transmission chamber 26 by a partition plate 24 that is provided with a hole 24' for controlling the outflow of oil. A driving disk 22 is mounted inside the torque transmission chamber 26. A circulatory passage 27 which is in communication with the working portion extends from the torque transmission chamber 26 into the oil reservoir chamber 25. A dam 28 is formed in the passage 27 which has an entrance port 27' and an exit port 27". A substantially hemispherical groove 29 is in communication with the passage 27 which is formed by retaining a partition wall on the inner surface of the oil reservoir chamber 25. The exit port 27" is located at the front open end of the groove 29 to place at least one of the entrance port 27' and the exit port 27" above the level of the oil existing in the oil reservoir chamber 25 whenever the engine stops.

In the conventional fan fluid coupling, when the engine stops or is at idle, the passage 27 is immersed in the oil held in the oil reservoir chamber 25. The oil is prevented from spontaneously flowing back into the torque transmission chamber 26 from the oil reservoir chamber through the passage 27. Therefore, the oil is prevented from being collected in the torque transmission chamber. Immediately after the engine is restarted, the rotational speed of the fan is prevented from increasing rapidly. This keeps the fan from producing extraordinarily loud noise. Also, in cold weather the warm-up of the engine is effectively performed. When the engine is at a high temperature, a valve member opens the outflow-adjusting hole 24' formed in the partition plate 24. Under this condition, if the engine is stopped while this hole 24' is immersed in the oil in the oil reservoir chamber 25, then the oil spontaneously flows out of the oil reservoir chamber through the hole 24', so that a large amount of oil is collected in the torque transmission chamber 26. Consequently, after the engine is restarted, the rotational speed of the driven fan increases for a given time as indicated by the performance characteristic line C in FIG. 10. This phenomenon is called drag.

When the engine is restarted as described above, if the valve member still opens the outflow-adjusting hole 24', then supply of oil into the torque transmission chamber 26 through the hole 24' is continued. As a result, the driven fan is maintained at a high rotational speed as indicated by the line C'. When the engine is restarted, if the valve member closes the hole 24', the fast rotation is maintained as indicated by the line C" until oil flows out of the torque transmission chamber via the dam.

SUMMARY OF THE INVENTION

It is an object of the present invention to provide a temperature-controlled fan fluid coupling having a driven fan which, when the associated engine comes to a halt after running at high temperatures, shows the aforementioned drag only for a quite short time immediately after the engine is restarted.

The invention provides a temperature-controlled fan fluid coupling comprising: a rotating shaft; a driving disk rigidly fixed to the front end of the shaft; an enclosed housing held to the shaft via a bearing and consisting of a cover and a case; a cooling fan mounted on the outer periphery of the housing; a partition plate which divides the inside of the housing into an oil reservoir chamber and a torque transmission chamber, the driving disk being mounted inside the torque transmission chamber; an outflow-adjusting hole formed in the partition plate for controlling outflow of oil; a dam formed on a part of the inner surface of the housing which is opposite to the outer surface of the driving disk and on which oil is collected during rotation of the disk; a circulatory passage extending from the torque transmission chamber to the oil reservoir chamber and communicating with the dam; a valve member which is mounted inside the cover and which, when the ambient temperature exceeds a predetermined temperature, opens the outflow-adjusting hole in the partition plate and which, when the ambient temperature is lower than the predetermined temperature, closes the hole; a temperature-sensing element mounted on the front surface of the cover and deforming with temperature variations, the valve member moving according to the deformation of the temperature-sensing element; and a gap formed between the outer portion of the driving disk and the opposite outer portion of the housing to transmit torque. The effective contact area of oil in the gap is increased or decreased to control the torque transmitted from the rotating shaft to the driven housing. The fan fluid coupling is characterized in that it further includes an idle oil reservoir chamber formed inside the driving disk, at least one small hole communicating with the torque transmission chamber, and a communicating means that is formed in the driving disk and places the idle oil reservoir chamber in communication with the torque transmission chamber only when the engine is at rest. The small hole is formed in the outer wall of the idle oil reservoir chamber, and the diameter of this hole is so set that the flow rate of oil flowing out through the hole is less than the flow rate of oil flowing out of the dam. The at least one small hole can also be plural in number and may be formed near the outermost portions of the side walls of the driving disk. The communicating means consists of a circular hole formed in the center of the torque transmission wall of the driving disk which is on the side of the partition plate. Alternatively, the communicating means consists of a plurality of holes formed in a circle around the axis of at least one of the torque transmission walls of the driving disk which are on the side of the partition plate and on the side of the case, respectively.

In this temperature-controlled fan fluid coupling, when the engine is at rest, oil is allowed to flow from the torque transmission chamber into the idle oil reservoir chamber and retained there by the circular hole formed in the driving disk as the communicating means and by the communication of the idle oil reservoir chamber with the small hole connected to the torque transmission chamber. Therefore, only a very small amount of oil is left in the torque transmission chamber. For this reason, immediately after the engine is restarted, the driven fan shows drag only for a quite short time. Hence, after the engine runs at high temperatures, if it is stopped under the condition that the valve member opens the flow-adjusting hole, then rapid increase in the rotational speed of the fan is prevented when the engine is restarted either at a low temperature or at a high temperature. In this way, the fan is kept from producing extraordinarily loud noise. Additionally, at low temperatures warm-up is accelerated. Furthermore, aforementioned drag can be effectively reduced.

Other objects and features of the invention will appear in the course of the description thereof which follows.

BRIEF DESCRIPTION OF THE DRAWINGS

FIG. 7 is a cross section similar to FIG. 1, but showing another fan fluid coupling according to the invention;

FIG. 8 is a plan view taken along line A—A of FIG. 7, showing the wall surface of an idle oil reservoir formed in a driving disk;

DETAILED DESCRIPTION OF THE PREFERRED EMBODIMENTS

Figure 1:
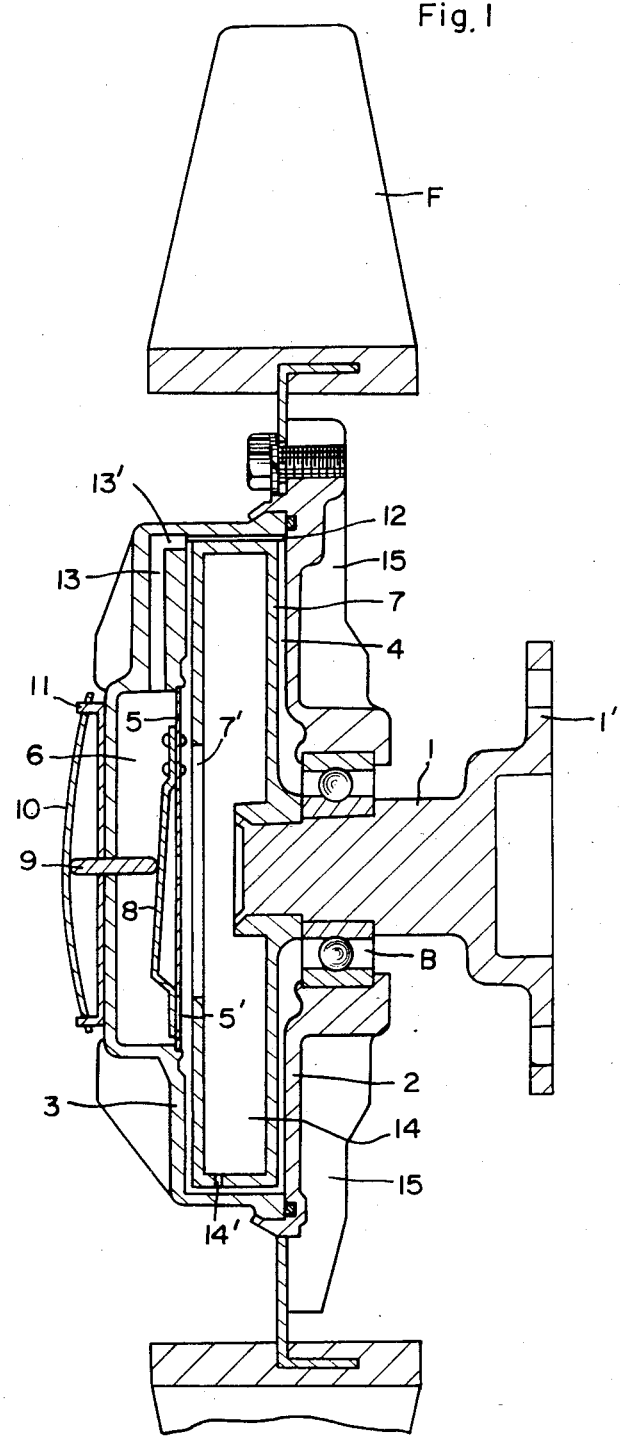
FIG. 1 is a vertical cross section of a temperature-controlled fan fluid coupling according to the invention.
Figure 2:
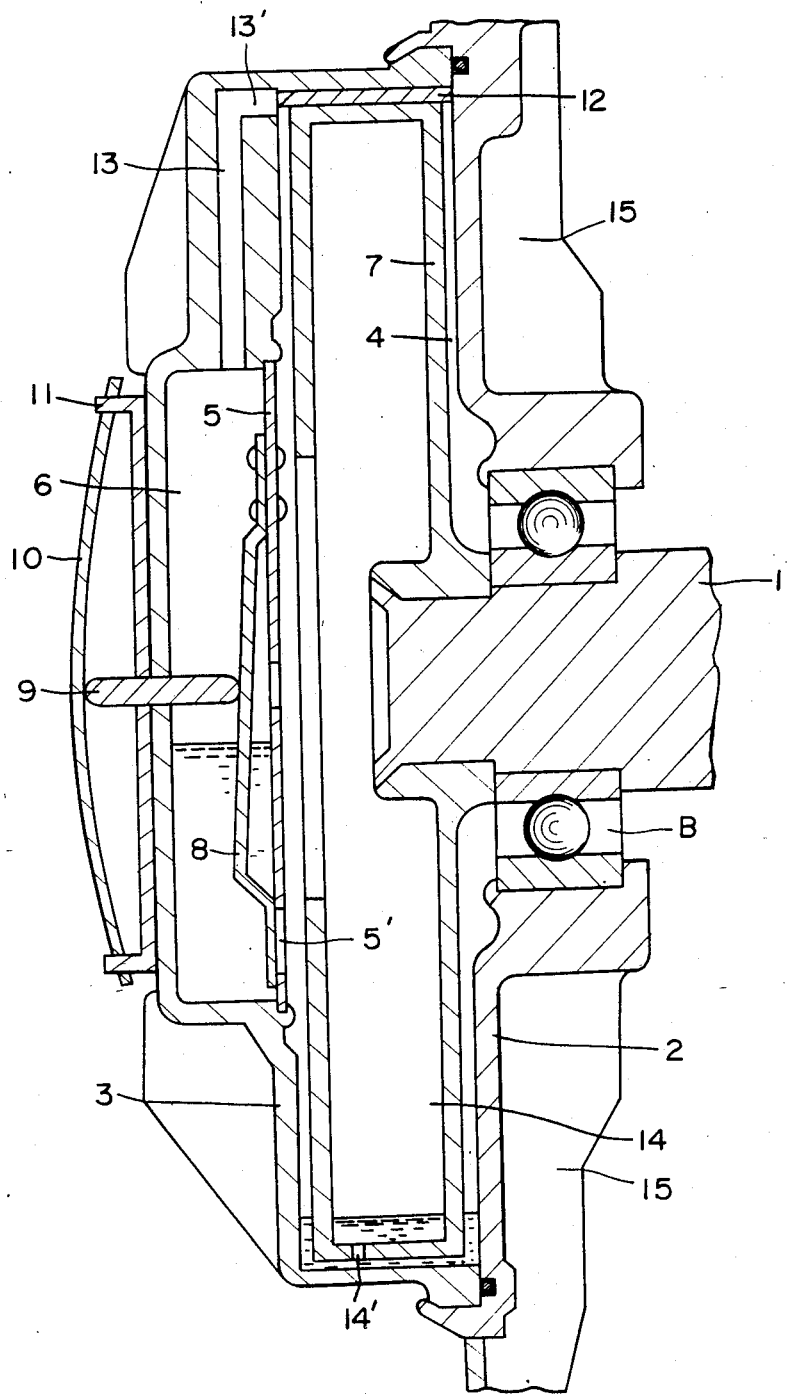
FIG. 2 is a partially cutaway enlarged view of FIG. 1, for showing the manner in which oil is collected when the engine is stopped at a low temperature.
Figure 3:
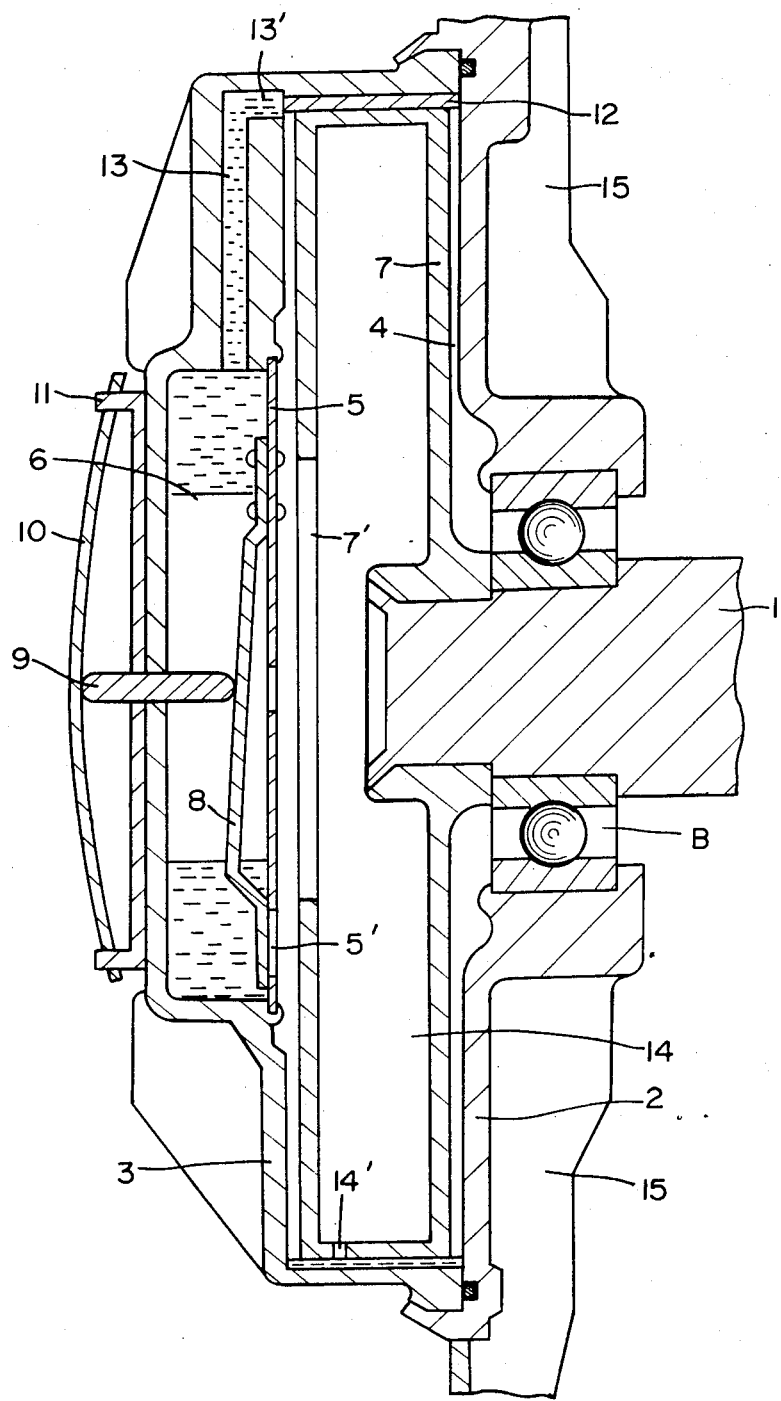
FIG. 3 is a view similar to FIG. 2, but showing the manner in which oil is collected when the fan is running or started to be rotated.
Figure 4:
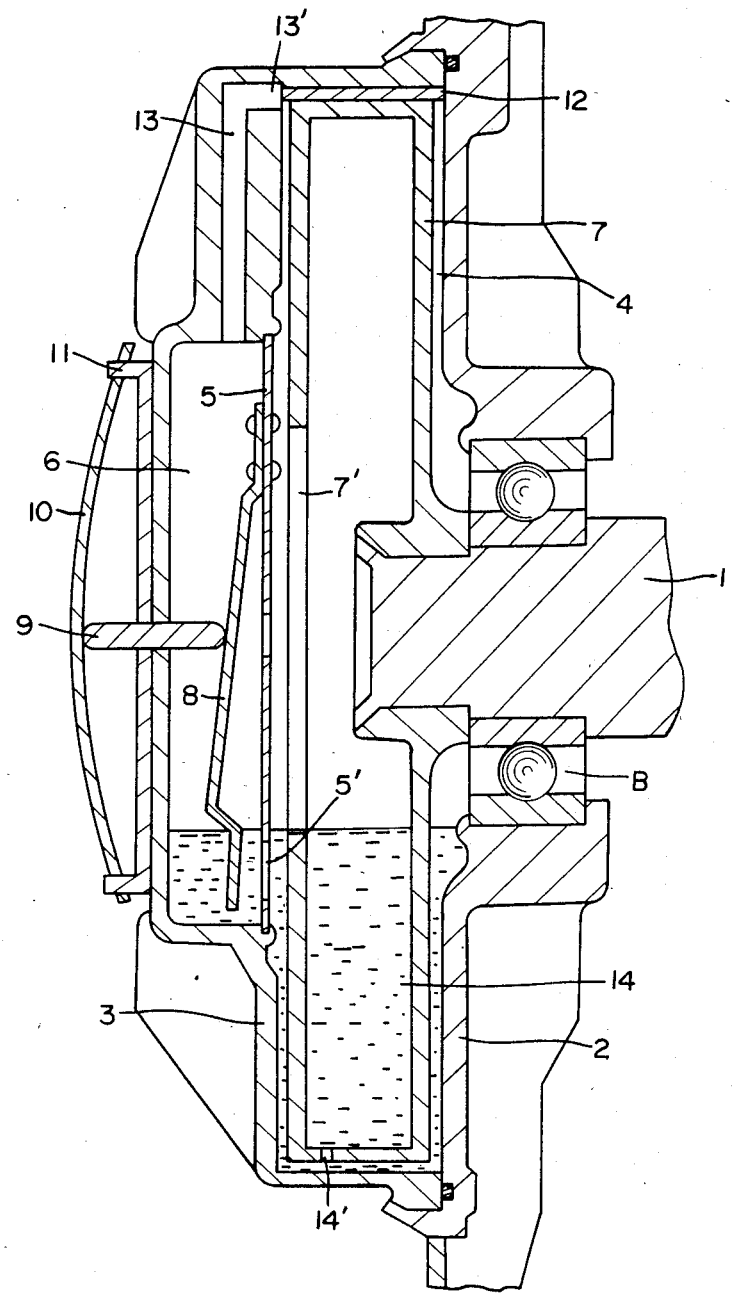
FIG. 4 is a view similar to FIG. 2, but showing the manner in which oil is collected when the engine stops after running at high temperatures.
Figure 5:
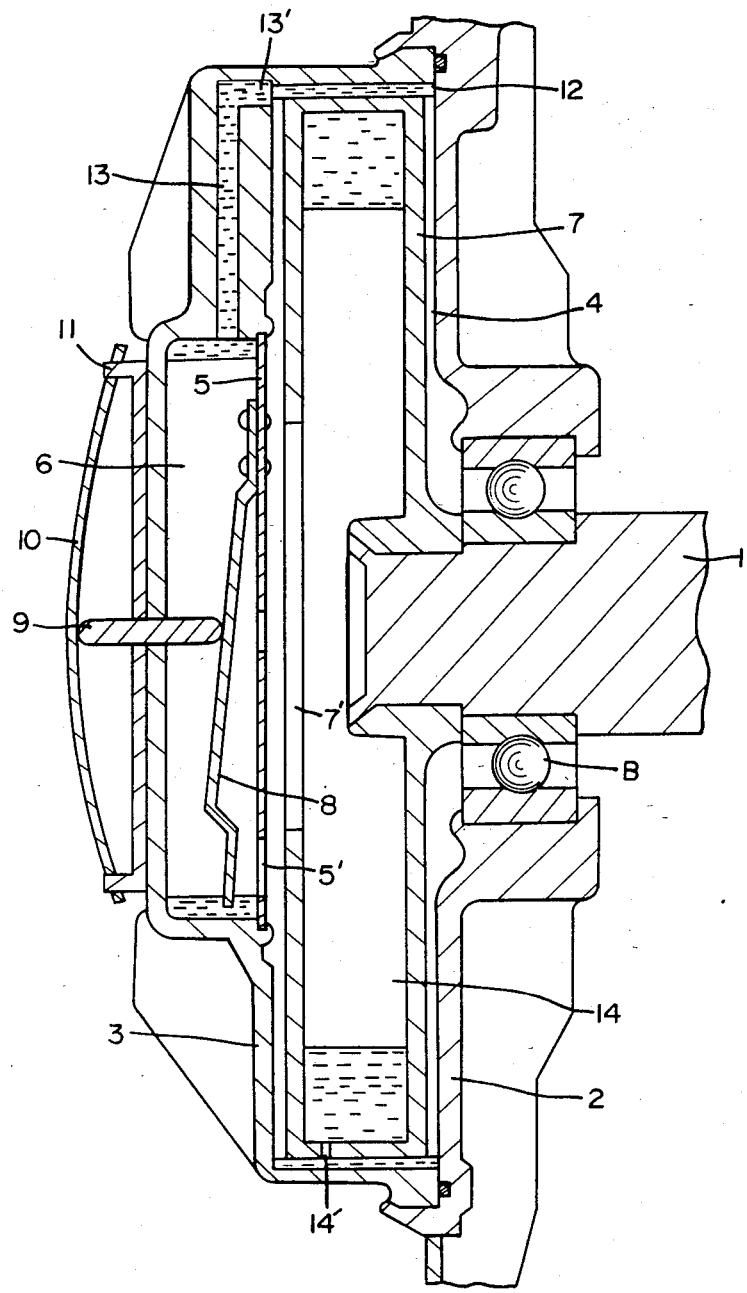
FIG. 5 is a view similar to FIG. 4, but showing the manner in which oil is collected when the fan is started after the condition shown in FIG. 4 is reached.
Figure 6:
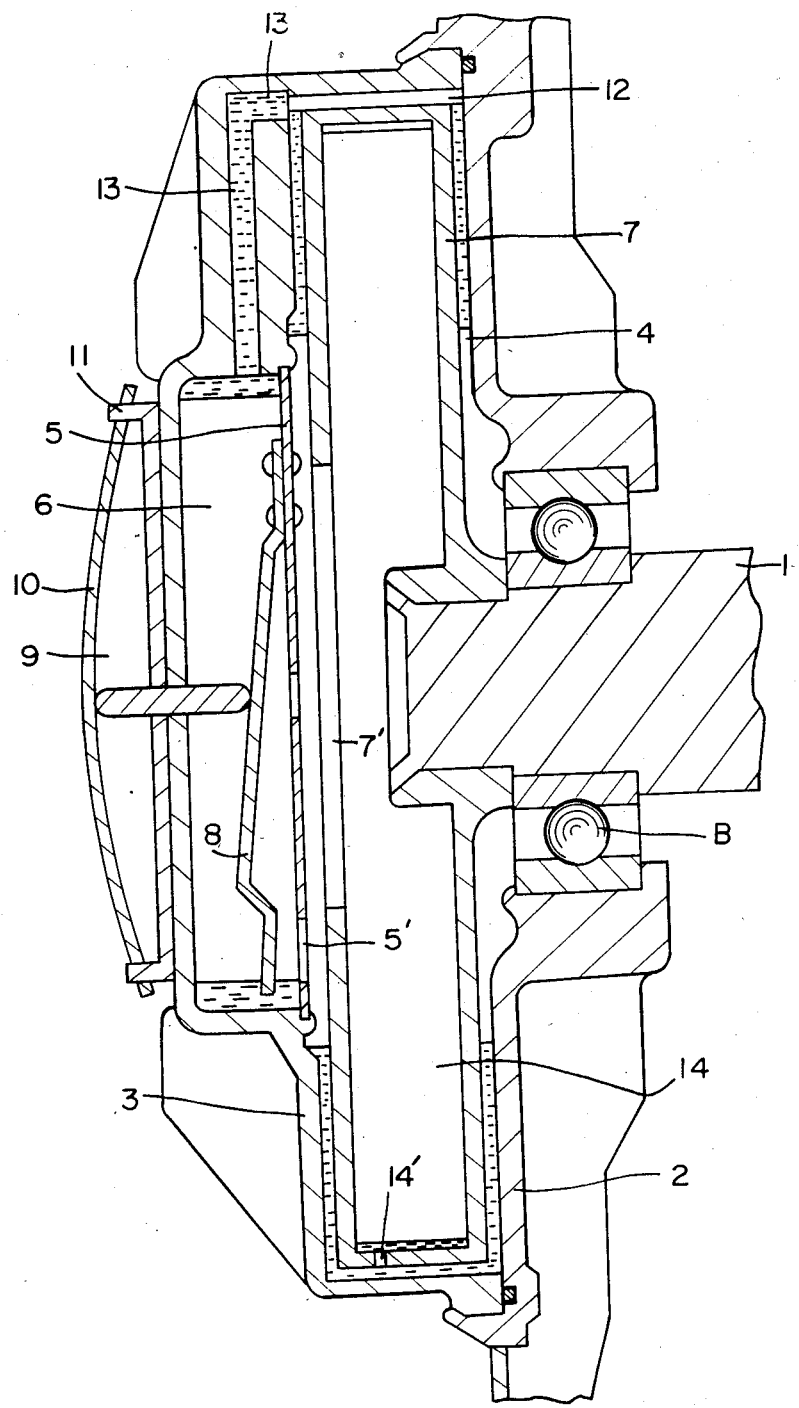
FIG. 6 is a view similar to FIG. 5, but showing the manner in which oil is collected when the fan has rotated for a time after the condition shown in FIG. 5 is reached.
Figure 9:
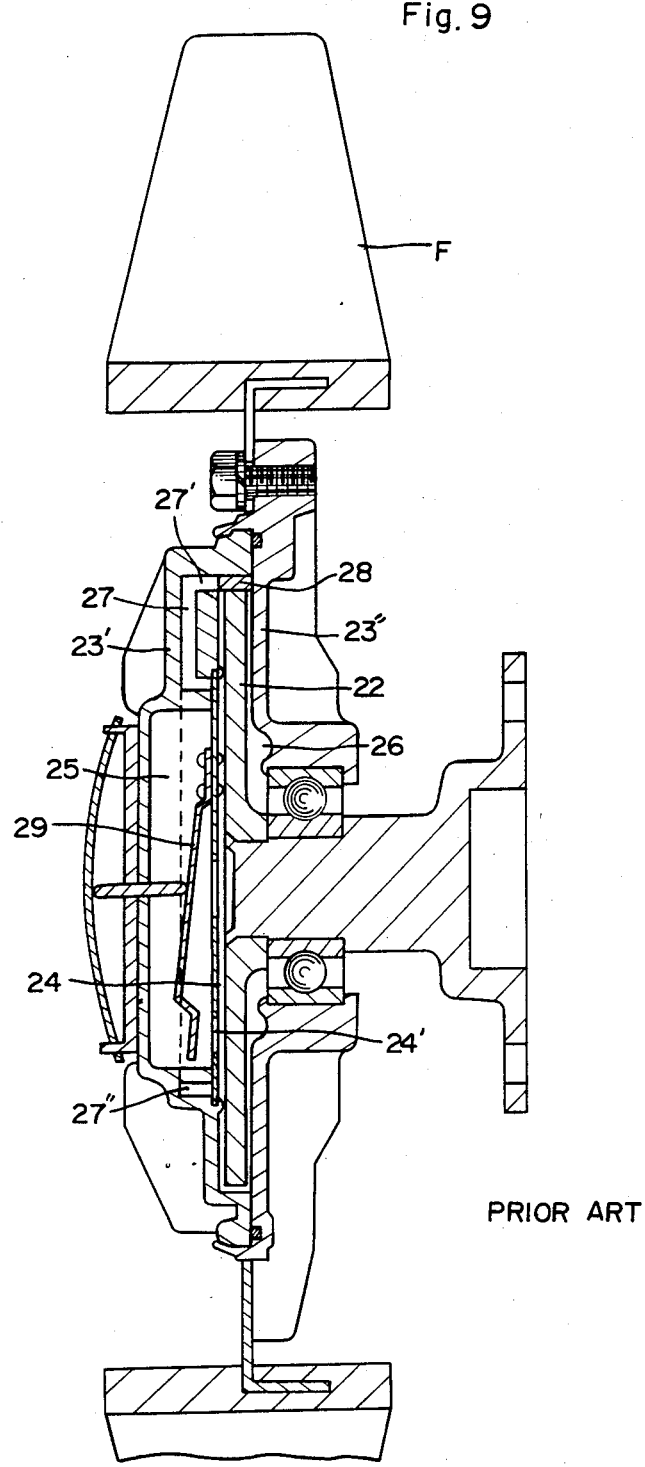
FIG. 9 is a vertical cross section of a conventional fan fluid coupling.

FIGS. 1-6 show a fan fluid coupling according to the invention. FIGS. 7 and 8 show another fan fluid coupling according to the invention. Referring to FIGS. 1-8, a driving disk 7 is rigidly fixed to the front end of a rotating shaft 1 which has a flanged wall 1' at its rear end. The flanged wall 1' is mounted to a corresponding base. The shaft 1 holds an enclosed housing consisting of a case 2 and a cover 3, via a bearing B. A cooling fan F is mounted on the outer periphery of the housing. The inside of the housing is divided into an oil reservoir chamber 6 and a torque transmission chamber 4 by a partition plate 5. The driving disk 7 is mounted in the transmission chamber 4. The partition plate 5 is provided with an outflow-adjusting hole 5' for adjusting the flow rate of oil flowing from the oil reservoir chamber 6 into the torque transmission chamber 4. A very narrow gap is retained in the transmission chamber 4 between the disk 7 and the opposite wall surface of the enclosed housing including the partition plate 5 to allow transmission of torque. The hole 5' is opened and closed by a valve member 8 one end of which is riveted to the wall surface of the partition plate 5 that is on the side of the oil reservoir chamber 6, the other being located in the adjusting hole 5'. A metallic fixture 11 is firmly fixed to the front surface of the cover 3. A temperature-sensing element 10 consists of a bimetallic strip both ends of which are anchored to the fixture 11. As the ambient temperature changes, the temperature-sensing element 10 deforms. The valve member 8 is connected to the temperature-sensing element 10 via a rod 9 which interlocks with the element 10.

A dam 12 is formed on a part of the inner surface of the enclosed housing which is opposite to the outer periphery of the driving disk 7. When the fan F is rotating, oil is collected on this inner surface of the housing 7. A circulatory passage 13 extending from the torque transmission chamber 4 to the oil reservoir chamber 6 is formed to pump out oil. The passage 13 is connected to an entrance port 13' close to the dam 12. The entrance port 13' is disposed on the upstream side of the dam 12 in the direction of rotation.

Referring to FIG. 1, a circular hole 7' is formed in the center of the torque transmission wall of the driving disk 7 which is on the side of the partition plate 5.

In the fan fluid coupling shown in FIGS. 7 and 8, a plurality of holes 7' are formed in a circle around the axis of at least one of the torque transmission walls of the disk 7 which are on the side of the partition plate 5 and on the side of the case 2, respectively.

Only when the fan is at rest, the hole or holes 7' place an idle oil reservoir chamber 14 in communication with the torque transmission chamber 4 to permit oil to circulate. The idle oil reservoir chamber 14 is formed in the disk 7, and its inside is hollow. At least one small hole 14' is formed in the outer wall of the chamber 14. The diameter of the hole 14' is so set that the flow rate of oil flowing out through this hole 14' is less than the flow rate of oil flowing out of the dam 12. Cooling fins 15 protrude outwardly and radially from the outside of the enclosed housing.

The temperature-sensing element 10 consisting of the bimetallic strip can take a volute form. In this case, the temperature-sensing element 10 deforms so as to move in a spiral path. Then, the valve member 8 is caused to slide right or left to thereby open or close the adjusting hole 5'.

The idle oil reservoir chamber 14 is formed inside the driving disk 7. The small hole or holes 14' communicating with the torque transmission chamber 4 are formed in the outer wall of the idle oil reservoir chamber 14. The diameter of the holes 14' are so set that the flow rate of oil from the reservoir chamber 14 is less than the flow rate of oil from the dam 12. The driving disk 7 is provided with the hole 7' to permit oil to spontaneously circulate between the idle oil reservoir chamber 14 and the torque transmission chamber 4 only when the engine is at rest. Therefore, when a large amount of oil is collected in the torque transmission chamber 4 after the engine runs at high temperatures, if the engine is stopped, then oil is allowed to flow into the idle oil reservoir chamber 14 from the torque transmission chamber 4 through the hole 7'. As a result, only a little oil is left in the transmission chamber 4. Then, if the engine is restarted, oil is gradually forced into the torque transmission chamber 4 through the small hole or holes 14' by the centrifugal force produced by rotation. At the same time, the dam 12 forces oil at a larger flow rate into the oil reservoir chamber 6 through the passage 13.

Figure 10:
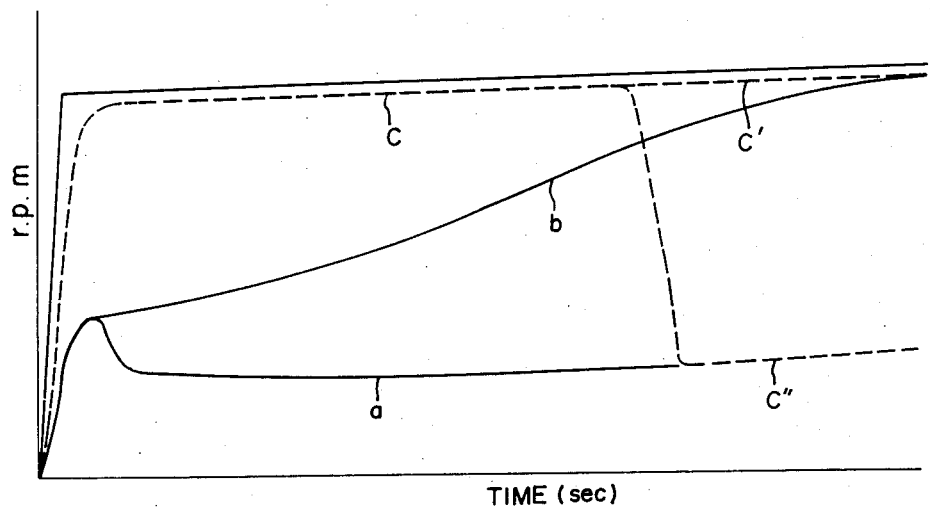
FIG. 10 is a graph in which the rotational speeds of fans are plotted against time, for comparing the performance of the novel fan fluid couplings shown in FIGS. 1-8 with the performance of the conventional fan fluid coupling shown in FIG. 9.

This is next described in further detail by referring to FIG. 10. When the engine is restarted, if the valve member closes the outflow-adjusting hole 5', then oil flows into the idle oil reservoir chamber 14 through the hole 7' and then gradually flows out of the chamber 14 through the small hole or holes 14', but almost no oil is left in the torque transmission chamber 4 because more oil is discharged from the dam 12. Hence, drag occurs only for a quite short time as indicated by the line a.

If the engine is restarted while the adjusting hole 5' is opened by the valve member 8, the maximum rotational speed of the fan is considerably lower than conventional, because a less amount of oil is left in the torque transmission chamber 4 than conventional. That is, during the stop of the engine, oil flowed into the torque transmission chamber 4 through the hole 7' and was retained in the idle oil reservoir chamber 14. After the engine is restarted, the oil in the torque transmission chamber 4 is supplied into the oil reservoir chamber 6 via the dam 12 but again flows into the torque transmission chamber 4, since the outflow-adjusting hole 5' is open. The oil gradually flowing out through the small hole or holes 14' adds to the oil flowing into the chamber 4. Consequently, the rotational speed increases gradually as indicated by the line b.

What is claimed is:

1. A temperature-controlled fan fluid coupling comprising:
    an enclosed housing which is driven and includes a cover and a case;
    cooling fan members mounted on the outer periphery of the housing;
    a partition plate that divides the inside of the housing into an oil reservoir chamber and a torque transmission chamber;
    an outflow-adjusting hole formed in the partition plate for adjusting outflow of oil;
    a driving rotating shaft having a front end mounted inside the torque transmission chamber said shaft the housing via a bearing;
    a driving disk mounted to the front end of the rotating shaft;
    a dam formed on a part of the inner surface of the housing which is opposite to the outer periphery of the driving disk and on which oil is collected during rotation of the rotating shaft;
    a circulatory passage located close to the dam and extending from the torque transmission chamber to the oil reservoir chamber;
    a temperature-sensing element which is mounted on the cover and which, when the ambient temperature varies, deforms;
    a valve member which opens or closes the outflow-adjusting hole in the partition plate according to the deformation of the temperature-sensing element;
    a gap formed between the outer portion of the driving disk and the opposite outer portion of the housing for transmitting torque;
    an idle oil chamber formed inside the driving disk;
    at least one small hole formed in the outer wall of the idle oil reservoir chamber and communicating with the torque transmission chamber, the diameter of the small hole being so set that the flow rate of oil flowing out through this small hole is less than the flow rate of oil flowing out of the dam;
    a communicating means formed in the driving disk for placing the idle oil chamber in communication with the torque transmission chamber only when the engine is stopped;
    and wherein the effective contact area of oil in the gap is increased or decreased to control the torque transmitted from the driving, rotating shaft to the driven housing.

2. The fan fluid coupling of claim 1, wherein a plurality of small holes are formed in the outer wall of the driving disk.

3. The fan fluid coupling of claim 2, wherein said small holes are formed near the outermost portions of the side walls of the driving disk.

4. The fan fluid coupling of claim 1, wherein said communicating means consists of a circular hole formed in the center of the torque transmission wall of the driving disk which is on the side of the partition plate.

5. The fan fluid coupling of claim 1, wherein said communicating means consists of a plurality of holes formed in a circle around the axis of at least one of the torque transmission walls of the driving disk which are on the side of the partition plate and on the side of the case, respectively.

6. The fan coupling of claim 1, wherein said small hole is formed near the outermost portions of the side walls of the driving disk.

* * * * *